US009735537B1

(12) United States Patent
Rothenberg et al.

(10) Patent No.: US 9,735,537 B1
(45) Date of Patent: Aug. 15, 2017

(54) HYBRID SPECTRAL AND COHERENT BEAM COMBINER UTILIZING 1D FIBER ARRAYS

(71) Applicants: Joshua E. Rothenberg, Los Angeles, CA (US); Eric C. Cheung, Torrance, CA (US); Gregory D. Goodno, Los Angeles, CA (US)

(72) Inventors: Joshua E. Rothenberg, Los Angeles, CA (US); Eric C. Cheung, Torrance, CA (US); Gregory D. Goodno, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 4 days.

(21) Appl. No.: 15/097,043

(22) Filed: Apr. 12, 2016

(51) Int. Cl.
*G02F 1/01* (2006.01)
*H04B 10/25* (2013.01)
(Continued)

(52) U.S. Cl.
CPC ........ *H01S 3/2391* (2013.01); *G02B 27/0037* (2013.01); *G02B 27/0927* (2013.01); *G02B 27/1006* (2013.01); *G02B 27/1086* (2013.01); *G02B 27/30* (2013.01); *H01S 3/0071* (2013.01); *H01S 3/0085* (2013.01);
(Continued)

(58) Field of Classification Search
CPC ............... G02B 27/30; G02B 27/1086; G02B 27/0927; G02B 27/0037; G02B 27/1006; H01S 3/2391; H01S 3/10053; H01S 3/0071; H01S 3/0085; H01S 3/2316; H01S 3/1305

USPC ........ 359/239, 249, 279, 334, 337.1, 337.11, 359/337.12, 337.13; 398/152, 158, 159, 398/160, 188; 372/6, 26, 27, 70
See application file for complete search history.

(56) References Cited

U.S. PATENT DOCUMENTS 6,192,062 B1 2/2001 Sanchez-Rubio et al.
6,208,679 B1 3/2001 Sanchez-Rubio et al.
(Continued)

OTHER PUBLICATIONS

Anderegg, Jesse, et al. "8-W coherently phased 4-element fiber array." *High-Power Lasers and Applications*. International Society for Optics and Photonics, 2003.
(Continued)

*Primary Examiner* — Tuyen Tra
(74) *Attorney, Agent, or Firm* — Tarolli, Sundheim, Covell & Tummino LLP (57) ABSTRACT

A system includes N master oscillators to generate N master oscillator driving signals. The system includes N splitters to split each of the N master oscillator signals into M coherent signals with M being a positive integer greater than one. A modulator and fiber amplifier stage adjusts the relative phases of the M coherent signals and generates M×N amplified signals. The M×N amplified signals are aggregated into M clusters of N fibers. The system includes M spectral beam combination (SBC) modules to combine each of the M clusters. Each SBC module combines the M×N amplified signals at N wavelengths and generates M tiled output beams. Each SBC module employs a single dimensional (1D) fiber optic array to transmit one cluster of N amplified signals from the M signal clusters and generates one tiled output beam of the M tiled output beams.

20 Claims, 6 Drawing Sheets

(51) Int. Cl.
H01S 3/23 (2006.01)
H01S 3/00 (2006.01)
G02B 27/30 (2006.01)
H01S 3/10 (2006.01)
G02B 27/10 (2006.01)
G02B 27/09 (2006.01)
G02B 27/00 (2006.01)
H01S 3/13 (2006.01)

(52) U.S. Cl.
CPC ........ H01S 3/10053 (2013.01); H01S 3/1305 (2013.01); H01S 3/2316 (2013.01)

(56) References Cited

U.S. PATENT DOCUMENTS

| | | | |
|---|---|---|---|
| 6,275,632 B1 * | 8/2001 | Waarts | G02B 6/29319 372/43.01 |
| 6,327,292 B1 | 12/2001 | Sanchez-Rubio et al. | |
| 6,697,192 B1 | 2/2004 | Fan et al. | |
| 7,346,085 B1 | 3/2008 | Rothenberg et al. | |
| 7,436,588 B2 | 10/2008 | Rothenberg et al. | |
| 7,440,174 B2 | 10/2008 | Rice et al. | |
| 8,493,650 B2 * | 7/2013 | Rothenberg | H01S 3/06712 359/337.13 |

OTHER PUBLICATIONS

Augst, Steven J., et al. "Wavelength beam combining of ytterbium fiber lasers." *Optics letters* 28.5 (2003): 331-333.

Fan, T. Y., and A. Sanchez. "Coherent (phased array) and wavelength (spectral) beam combining compared." *Lasers and Applications in Science and Engineering*. International Society for Optics and Photonics, 2005.

Hergenhan, Guido, Bernd Lücke, and Uwe Brauch. "Coherent coupling of vertical-cavity surface-emitting laser arrays and efficient beam combining by diffractive optical elements: concept and experimental verification." *Applied optics* 42.9 (2003): 1667-1680.

Khajavikhan, Mercedeh, A. Hoyer-Leitzel, and J. R. Leger. "Efficient conversion of light from sparse laser arrays into single-lobed far field using phase structures." *Optics letters* 33.20 (2008): 2377-2379.

Lapucci, A., F. Quercioli, and D. Jafrancesco. "Optimal phase filtering for high-power laser array far-field distribution." *Optics letters* 18.20 (1993): 1694-1696.

Leger, James R., Gary J. Swanson, and Wilfrid B. Veldkamp. "Coherent laser addition using binary phase gratings." *Applied optics* 26.20 (1987): 4391-4399.

Sanchez-Rubio, Antonio, et al. "Wavelength Beam Combining for Power and Brightness Scaling of Laser Systems." *Lincoln Laboratory Journal* 20.2 (2014).

Shay, Thomas M., et al. "Self-synchronous and self-referenced coherent beam combination for large optical arrays." *Selected Topics in Quantum Electronics, IEEE Journal of* 13.3 (2007): 480-486.

Swanson, Gary J., James R. Leger, and Michael Holz. "Aperture filling of phase-locked laser arrays." *Optics letters* 12.4 (1987): 245-247.

Vorontsov, Mikhail A., et al. "Adaptive array of phase-locked fiber collimators: analysis and experimental demonstration." *Selected Topics in Quantum Electronics, IEEE Journal of* 15.2 (2009): 269-280.

* cited by examiner

HYBRID SPECTRAL AND COHERENT BEAM COMBINER UTILIZING 1D FIBER ARRAYS

TECHNICAL FIELD

This disclosure relates to optical amplifier circuits, and more particularly to an optical beam combiner circuit that employs modular combining modules.

BACKGROUND

There is both commercial and military interest in generating very high power laser beams which can be focused to near the diffraction limit. Recent advances in high power fiber amplifiers have made available single power outputs of approximately one to two kilowatts with near pristine beams. However, power scaling interest extends to much higher power outputs, which requires a combination of many (e.g., 10's-100's or more) such fiber amplifier outputs into a single beam, while preserving their diffraction limited focusing property (e.g., beam quality or BQ). One conventional system uses a diffractive optical element (DOE) to enable the coherent combination of the output of many such fiber amplifiers. The coherent beam combination (CBC) requires active phasing of the outputs of the fiber amplifiers. Also, another conventional system uses an incoherent method where spectral beam combination (SBC) has been proposed and employed.

Although the use of a 2D fiber array offers the promise of a more compact CBC system, the large number of fibers in a single 2D array leads to much more complex controls of phase, and other optical properties such as polarization and optical path length, as well as the challenges associated with alignment precision of integration of the large number of free-space fiber outputs with the beam combining optical elements. One approach to mitigate the complexity of coherently combining a large number of fiber amplifiers is via a two-stage coherent combination scheme. This allows separate and independent control loops to mitigate fiber count and signal-to-noise requirements in any given control loop. Another conventional approach makes use of a hybrid coherent DOE and incoherent spectral beam combining (SBC). The SBC does not require phase control, but both of these approaches (CBC and hybrid CBC/SBC) still require a large integration of a complex 2D array of beams with high alignment precision.

SUMMARY

This disclosure relates to an optical beam combiner system that employs modular combining modules. In one aspect, a system includes N master oscillators to generate N master oscillator driving signals. Each driving signal is at N different wavelengths with N being a positive integer greater than one. The system includes N splitters to split each of the N master oscillator signals into M coherent signals with M being a positive integer greater than one. A modulator and fiber amplifier stage adjusts the relative phases of the M coherent signals and generates M×N amplified signals. The M×N amplified signals are aggregated into M clusters of N fibers where each of the M clusters includes one wavelength from each of the N master oscillator signals. The system includes M spectral beam combination (SBC) modules to combine each of the M clusters. Each SBC module combines the M×N amplified signals at N wavelengths and generates M tiled output beams. Each SBC module employs a single dimensional (1D) fiber optic array to transmit one cluster of N amplified signals from the M signal clusters and generates one tiled output beam of the M tiled output beams. A collimator combines each of the tiled output beams from the output of each of the M SBC modules to generate a single aggregate combined amplified output beam.

In another aspect, an apparatus includes a plurality of master oscillators to generate a plurality of master oscillator driving signals. Each of the driving signals are at a different wavelength. A plurality of splitters split each of the plurality of master oscillator signals into a plurality of coherent signals. A plurality of modulators adjust the phase of each of the plurality of coherent signals to generate a plurality of phased signals relative to other signals originating from the same master oscillator. Each of the plurality of modulators have a plurality of inputs and each of the plurality of inputs receive one signal from each of the plurality of coherent signals. A plurality of amplifiers generate a plurality of amplified signal clusters from the plurality of phased signals. Each of the plurality of amplified signal clusters include one amplified signal from each of the plurality of master oscillators. A plurality of spectral beam combination (SBC) modules combine each of the plurality of amplified signal clusters and generate a plurality of tiled output beams. Each SBC module from the plurality of SBC modules employs a single dimensional (1D) fiber optic array to receive one amplified signal cluster from the plurality of amplified signal clusters and generates one tiled output beam of the plurality of tiled output beams. A collimator combines each of the plurality of tiled output beams from the output of each of the plurality of SBC modules to generate a single aggregate combined amplified output beam.

In yet another aspect, a method includes coherently splitting each of N master oscillator signals of different wavelengths into M coherent signals where N and M are positive integers greater than one. The method includes amplifying the M coherent signals to generate M amplified signals. This includes gathering one of the M amplified signals at each of the N wavelengths to form one of M clusters of amplified signals. Each cluster of the M clusters include one amplified signal at each of the N wavelengths. The method includes routing the M amplified clusters of signals into M single dimensional (1D) fiber optic arrays. Each array transmits one amplified signal cluster from the M amplified signal clusters. The method includes spectrally combining each of the M amplified signal clusters from the 1D fiber optic arrays to generate M tiled output beams. The method includes collimating each of the M tiled output beams to generate a single aggregate combined amplified output beam.

DETAILED DESCRIPTION

This disclosure relates to a coherent and spectral beam combiner system, method, and apparatus for combining high power laser beams via a modular system configuration that utilizes a single dimensional fiber array. The modular system configuration mitigates complex manufacturing of the system which reduces system costs. This also facilitates repair and maintenance of the system since individual modules of the system can be replaced when necessary without affecting other portions of the system. In contrast to prior art systems that employ a complex and clustered two-dimensional array that would require an expensive replacement of the entire array if a single fiber of the array were to fail, the coherent and spectral beam combiner system and method allows for replacement of single dimensional elements of the array via modular processing, amplification, and transmittal of beam signals in the system.

A scalable and modular system and method is provided that reduces the complexity of a combination of a large number of fiber amplifier beams, and thus provides a more robust architecture for maintenance and operation. Several aspects of the modular system are provided which includes a two stage hybrid spectral beam combination (SBC) and coherent beam combination (CBC). The modular system includes several stages where the first stage each of M independent SBC modules are seeded by N Master Oscillators (MOs) of differing wavelengths, where M and N are positive integers, respectively. These SBC modules include a single dimensional fiber array, collimation optics, and a grating. Each master oscillator output is split into M coherent signals to provide coherent seeds to each of the M SBC modules. The output beams of the SBC modules can be shaped to be elliptical to reduce beam intensity without degrading beam quality.

Figure 1:
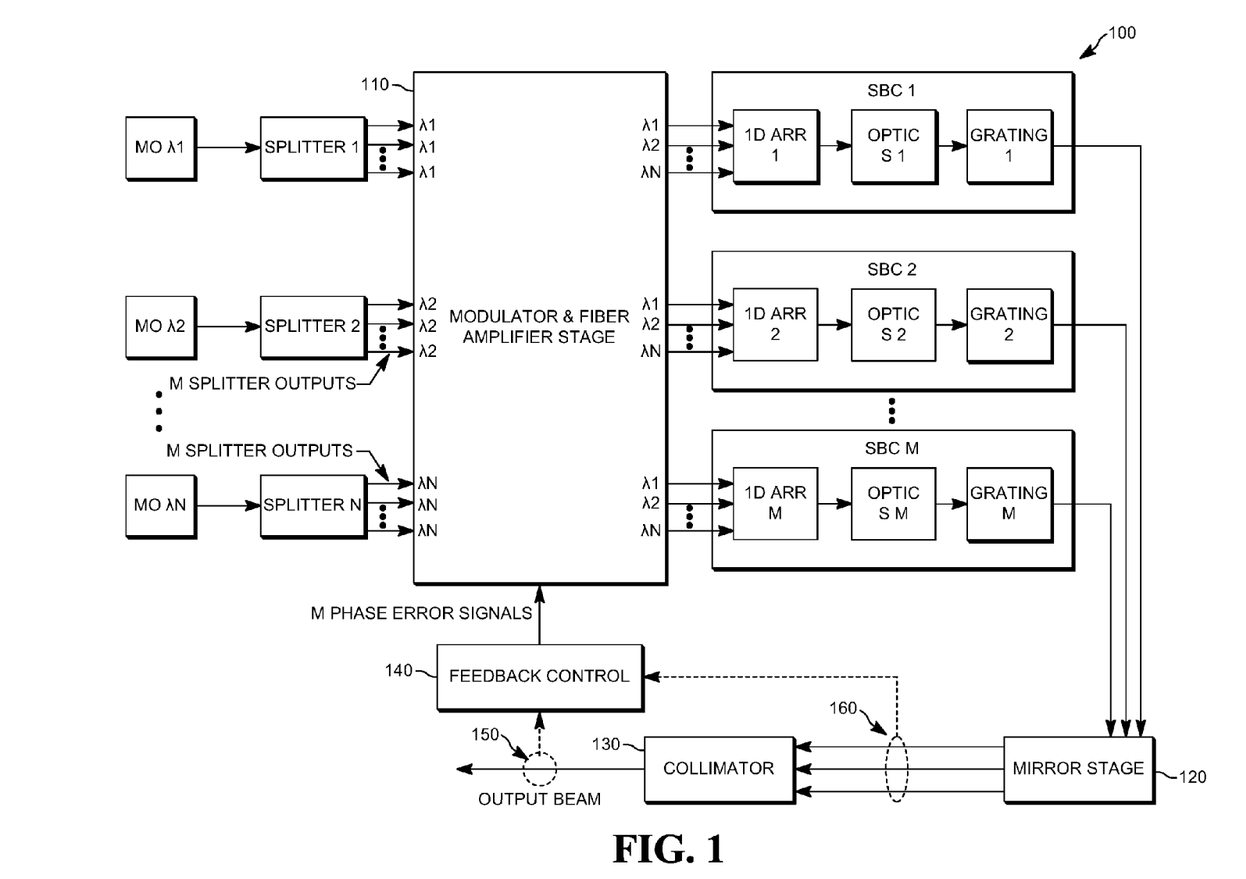
FIG. 1 illustrates an example of a modular spectral and coherent beam combining system.

FIG. 1 illustrates an example of a modular spectral and coherent beam combining system 100. The system 100 includes N master oscillators shown as MO λ1 though MO λN to generate N master oscillator driving signals, where N is a positive integer greater than one. The system 100 includes N splitters shown as splitters 1 though N to split each of the N master oscillator signals into M coherent signals where M is a positive integer greater than one. The system 100 includes a modulator and amplifier stage 110 to adjust the phase of the M coherent signals and to generate M amplified signals. As will be shown in more detail with respect to FIGS. 2 and 3 below, the modulator and amplifier stage 110 can include M modulators to adjust the phase of each of the M coherent signals and M amplifiers to generate M×N amplified signals that are aggregated into M clusters of N fibers.

The system 100 includes M spectral beam combination (SBC) modules shown as SBC module 1 though M to combine each of the M clusters from the modulator and amplifier stage 110 and to generate M tiled output beams. Each SBC module employs a single dimensional fiber optic array shown as 1D array 1 though M each SBC module combines the M×N amplified signals at N wavelengths and generates M tiled output beams. Each SBC module employs a single dimensional (1D) fiber optic array to transmit one cluster of N amplified signals from the M signal clusters and generates one tiled output beam of the M tiled output beams. A mirror stage 120 directs the M tiled output beams to a collimator 130 that combines each of the tiled output beams from the output of each of the M SBC modules 1 though M to generate a single aggregate combined amplified output beam shown as OUTPUT BEAM.

Each of the SBC modules 1 though M can include a lens and a collimating mirror which are depicted as optics 1 though M. The lens passes the amplified signals from the 1D array and the collimating mirror directs the amplified signals passed from the lens within the SBC module. Each SBC module 1 though M can also include a grating to spectrally combine the amplified signals directed from the collimating mirror in the respective SBC module. In one example, the lens can be an elliptical shaped lens to generate elliptical beams for the M tiled output beams and facilitate closer packing of the M tiled output beams. Beam packing will be described in more detail below with respect to FIG. 2. The mirror stage 120 can include M pickoff mirrors (also referred to as scraper mirrors) having scraper edges to clip Gaussian beams of the M tiled output beams from the SBC modules and to facilitate closer packing of the M tiled output beams and as will be described in more detail with respect to FIG. 2.

The collimator 130 can include a transmissive optical element, a reflective optical element, or diffractive optical element (DOE), for example, to compensate for spherical and interference phases of the M tiled output beams. A feedback control circuit 140 can be employed to sample the combined amplified output beam from the collimator 130 at 150 and to provide beam phase adjustment feedback to the amplifier and modulator stage 110. When sampled at 150, the feedback control circuit 140 can include a beam sampler to sample the combined amplified output beam from the collimator (See e.g., FIG. 2). Also, when sampling at 150, the feedback control circuit 140 can include a grating or wavelength de-multiplexer to direct the combined amplified output beam from the collimator 130 to N wavelength phase detectors (See e.g., FIG. 2). The feedback control circuit 140 can also include an N wavelength phase detector array to detect the phase of N sampled signals (See e.g., FIG. 2). This can include N synchronous M-beam processors to generate M phase error signals to adjust beam phases in the amplifier and modulator stage 110 (See e.g., FIG. 2).

Figure 2:
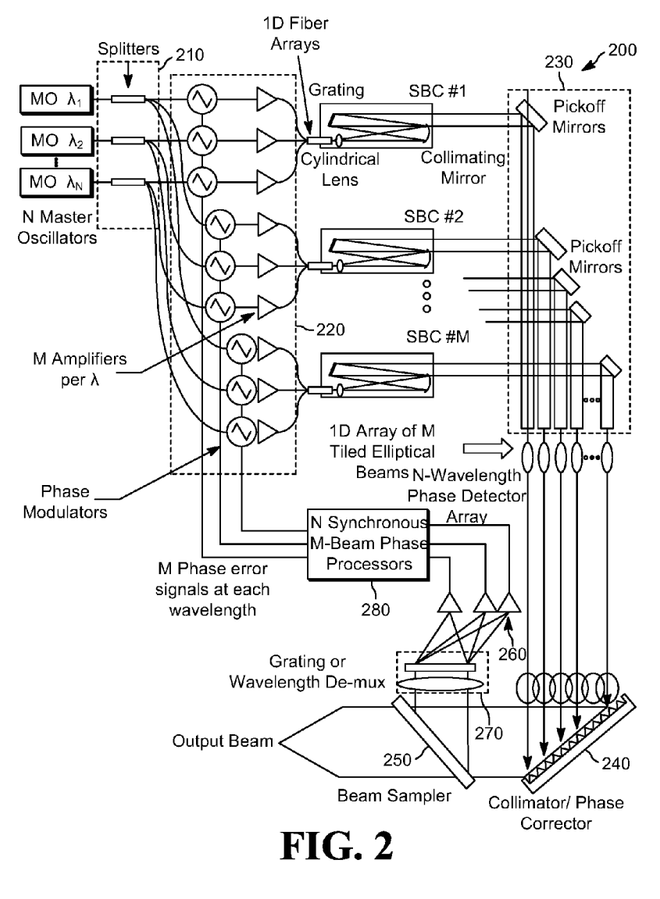
FIG. 2 illustrates an example implementation of a modular spectral and coherent beam combining apparatus.
Figure 3:
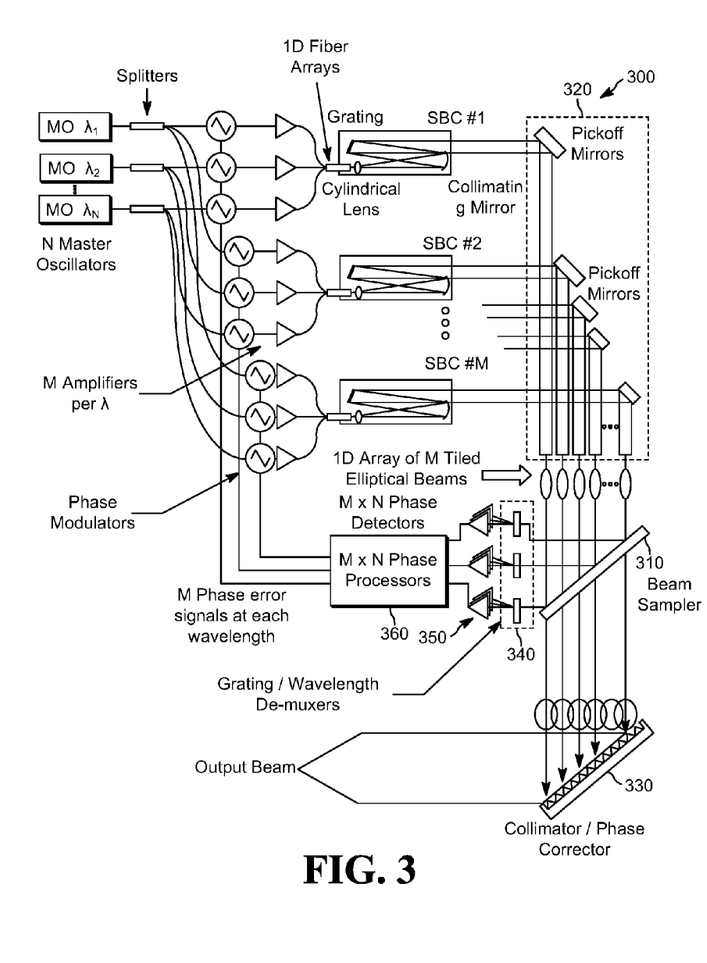
FIG. 3 illustrates an alternative example implementation of a modular spectral and coherent beam combining apparatus.

In an alternative aspect, instead of sampling at 150 (See e.g., FIG. 2 for post-collimator sampling), the system 100 can sample the M tiled output beams before the collimator 130 and shown at 160 (See e.g., FIG. 3 for pre-collimator sampling). Thus, when sampling at 160 before the collimator 130 as opposed to sampling at 150 after the collimator, the feedback control circuit 140 includes a beam sampler to sample the M tiled output beams before the collimator 130. In this aspect, the feedback control circuit 140 can include a grating or wavelength de-multiplexer to direct the M tiled output beams from the beam sampler and an M×N wavelength phase detector array to detect the phase of N wavelength signals from each of the M tiled output beams (See e.g., FIG. 3). An M×N phase processor in the feedback control circuit 140 generates M phase error signals to adjust beam phases in the amplifier and modulator stage 110 (See e.g., FIG. 3).

FIG. 2 illustrates an example implementation of a modular spectral and coherent beam combining apparatus 200. The apparatus 200 reduces the complexity of combination of a large number of fiber amplifier beams, and also provides a more robust architecture for maintenance and operation of such a modular system. In this modular aspect, a two-stage hybrid spectral beam combiner (SBC) and coherent beam combiner (CBC) are provided. In the first stage, each of M independent spectral beam combination (SBC) modules shown as modules 1 though M are seeded by N master oscillators (MOs) of differing wavelengths and shown as MO λ1 though MO λN. The SBC modules 1 though M can include a 1D fiber array, collimation optics, and a grating as previously described with respect to FIG. 1. Each MO output is split M ways by splitters at 210 to provide coherent seeds to each of the M SBC modules. Output from the splitters can be passed to an amplifier and modulator stage 220 which include M modulators and M amplifiers. As noted previously, the output beams of the SBC modules can be shaped to be elliptical to reduce beam intensity without degrading beam quality (BQ) by use of cylindrical lenses in the collimation optics, or such cylindrical optics could also be located elsewhere in the system.

The SBC module outputs are tiled in a close packed 1D array by use of closely spaced pickoff ('scraper') mirrors shown at 230. To achieve the closest packing (which results in the best combined Strehl factor) these mirrors at 230 may have losses owing to the wings of Gaussian beams being clipped by the scraper edges. If the beams are elliptical, then stacking the beams across the narrow dimension is suitable for a symmetric combined beam. In addition, if the elliptical beams are oriented suitably, one can effect a change in substantially all MO wavelengths to result in an angular beam shift orthogonal to the stacking direction. Thus, if the dispersion direction is orthogonal to the beam stacking direction, then a change in MO wavelength can change the diffraction angle from the SBC grating, and hence can be used for fine tuning of the output beam pointing. If all the MO wavelengths are concurrently shifted, the combined output beam can be angularly shifted as well. It is noted that this ellipse orientation is orthogonal to that which is desired by the SBC modules for suitable beam quality (BQ) performance, and hence may employ additional optics (not shown). The SBC angular wavelength shift can be combined with a phase tilt from beam to beam to produce an angular tilt in the stacking direction of the phased 1D array, enabling fine steering of the beam in two dimensions, for example.

The input beam array from the mirrors at 230 is allowed to diffract such that the tiled beams overlap. A collimator 240 (e.g., corrector optic such as a transmissive or reflective optic with a precisely shaped surface profile or a diffraction limited optical element (DOE)) compensates for the spherical and interference phase of the overlapped tiled array. The output beam is sampled by a beam sampler 250, and each of the N constituent wavelengths is sensed on a phase detector 260. The wavelengths can be separated for phase detection by a grating or filter as shown at 270. For each wavelength, the M constituent phase signals can be extracted via a synchronous detection scheme, or optimized using any of a number of hill climbing algorithms, for example. Alternatively, one can sample the beam prior to the collimator 240 and image each of the tiled beams to a separate detector (See e.g., FIG. 3) and directly derive a phase signal from each of the N constituent wavelengths via spectral filtering and a heterodyne technique to mitigate the need for synchronous extraction of the M phase signals or for use of a hill climbing algorithm, for example. As shown, output from the phase detector 260 is passed to N synchronous M-beam phase processors 280 to generate M phase error signals at each wavelength to adjust the phase modulators in the modulator and amplifier stage 220.

One aspect of the apparatus shown in FIGS. 2 and 3 is the utilization of the collimator 240 as a phase corrector. When the tiled beams are allowed to propagate a sufficient distance so that they expand and overlap, the beams develop phase curvature and when they overlap, begin to interfere. One aspect to efficient coherent beam combination (CBC) is compensation of this phase variation over the aggregate beam via the feedback in the system to the modulator and amplifier stage 220. With a suitable choice of parameters (e.g., beam size, pitch, and propagation distance), the collimator 240 can be configured to mitigate the resulting phase variation of the combined beam, and thus results in near diffraction-limited aggregate beam with very high Strehl ratio (fraction of far-field axial intensity relative to intensity that would be achieved with an ideal uniform beam).

FIG. 3 illustrates an alternative example implementation of a modular spectral and coherent beam combining apparatus 300. For purposes of brevity, each component of the apparatus 300 will not be described due to similarities with the apparatus previously described with respect to FIG. 2. In this alternative aspect, the apparatus 300 includes a beam sampler 310 to sample M tiled output beams from pickoff mirrors 320 before a collimator 330. This example apparatus 300 is in contrast to the apparatus 200 depicted above with respect to FIG. 2 since beam sampling occurs before the collimator 300 versus sampling after the collimator as shown in FIG. 2. As shown, the apparatus 300 can include a grating or wavelength de-multiplexer at 340 to direct the M tiled output beams from the beam sampler 310. An M×N wavelength phase detector array 350 detects the phase of N wavelength signals from each of the M tiled output beams. An M×N phase processor 360 (or processor array) generates M phase error signals to adjust beam phase in the amplifier and modulator stage.

Figure 4:
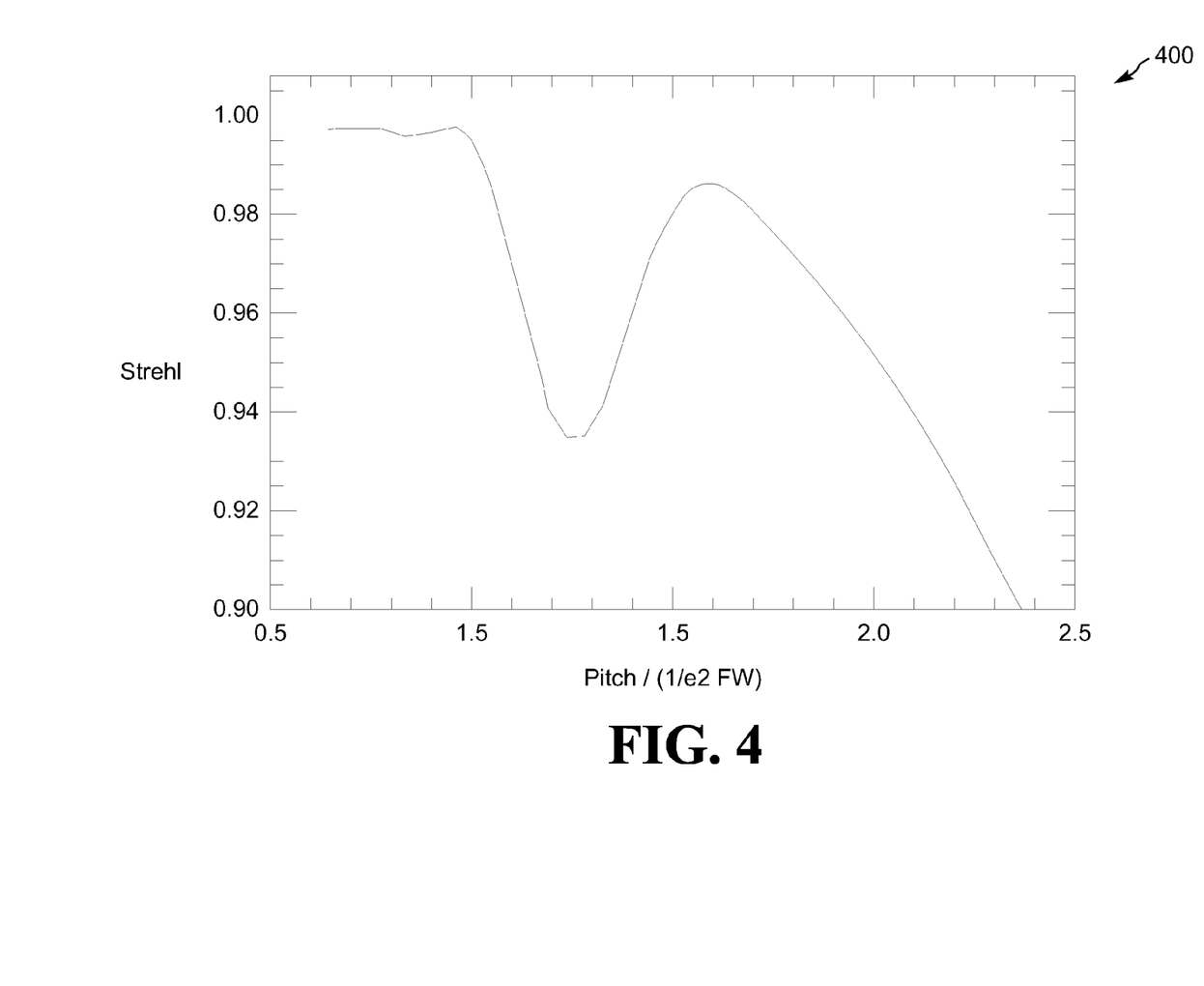
FIG. 4 is an example diagram illustrating Strehl ratio of a combined 1D array of overlapped Gaussian beams versus array pitch.

FIG. 4 is an example diagram 400 illustrating Strehl ratio of a combined 1D array of overlapped Gaussian beams versus array pitch. The diagram 400 shows the calculated Strehl ratio for a 1D tiled array of Gaussian beams, assuming the beams are allowed to diffract through propagation from launch such that their beam widths expand by 2×, and the collimator/corrector mitigates any phase error in the aggregate beam (e.g., the corrector effectively applies the conjugate of the overlapping beam array's phase). The Strehl ratio is plotted in the diagram 400 on the vertical axis versus the assumed spacing (pitch) ratio on the horizontal axis between the fiber beams relative to the beam full width at 1/e2 at the launch plane of the mirrors/scrapers. For small pitch, one can determine that nearly ideal (100%) Strehl ratio can be achieved. However, since the beam is assumed to expand by 2× in this example (one can also configure for larger beam expansion and overlap, but interference effects become more severe and appear to limit achievable Strehl). Generally, one can't efficiently achieve a very small pitch, since the beams should be separately propagated from the pickoff mirror array (and thus can't be overlapped at the pickoff mirror array plane), which may require large beam 'scraping' losses to tile the beams. As an approximate rule, an assumption is to tolerate approximately 1% total scraping losses, then a pitch equal to 1.4 times the beam full width at 1/e2 is about the smallest ratio achievable. From the diagram 400, one can observe that Strehl of almost 99% is achieved for a pitch equal to approximately 1.6× the scraper array beam 1/e2 full width, for which the scraping loss is less than 0.2%, for example.

Figure 5:
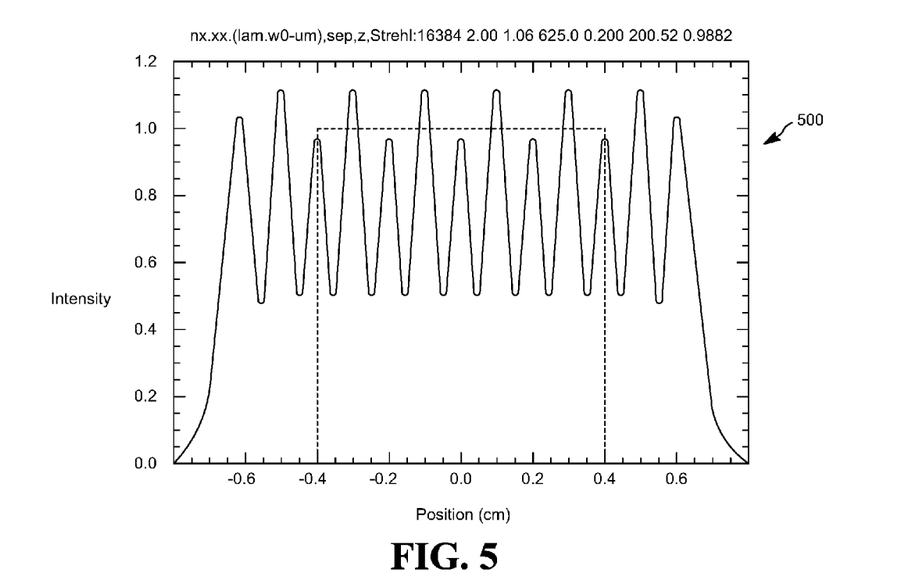
FIGS. 5 and 6 are example diagrams illustrating intensity and phase of a 1D array of overlapped Gaussian beams.
Figure 6:
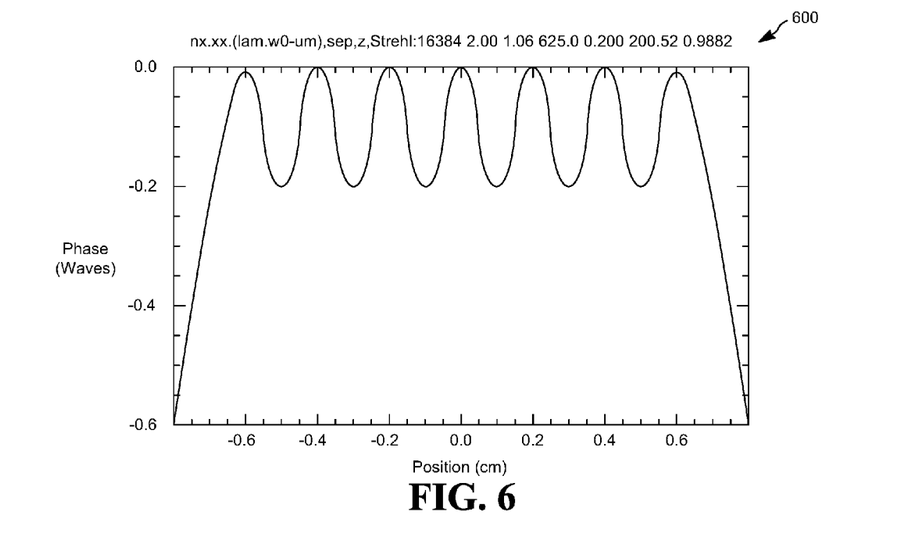

FIGS. 5 and 6 are example diagrams 500 and 600 illustrating intensity and phase of a 1D array of overlapped Gaussian beams. The diagram 500 shows the intensity and uncorrected phase of the beam array along the array axis at the center of the beams in the overlap plane for a pitch equal to 1.6× the input beam 1/e2 full width. Due to significant overlap, one can observe a modest variation in both intensity and phase. For this particular configuration point, the phase excursion over the interference region is less than 0.25 waves, which should enable manufacture of the corrector optic well within fabrication limits.

It is noted, that in these simulations for the diagrams 500 and 600, the Strehl is calculated over the center of the array (as depicted by the dotted line in the top of diagram 500) and the edge effects are ignored. For a given corrector configuration, one can vary the input beam wavelength by 40 nm without substantially any significant variation in Strehl ratio. This provides a useful feature for combining beams from the first stage SBC modules, each of which could have a total spectrum of 10's of nm.

Figure 7:
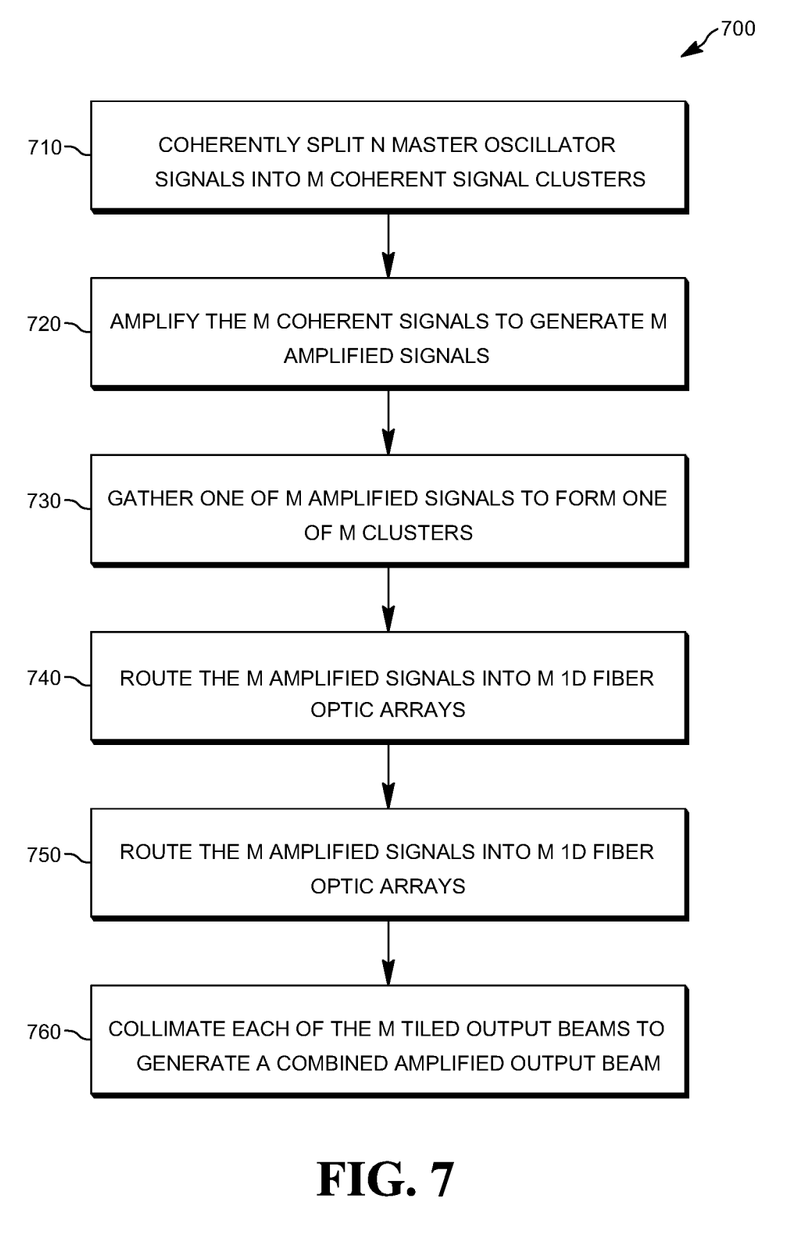
FIG. 7 illustrates an example of a spectral and coherent beam combining method.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 7 illustrates an example of a spectral and coherent beam combining method 700. At 710, the method 700 includes coherently splitting each of N master oscillator signals of different wavelengths into M coherent signals with N and M being positive integers greater than one (e.g., via splitters 1-N of FIG. 1). At 720, the method 700 includes amplifying the M coherent signal clusters to generate M amplified signals (e.g., via modulator and amplifier stage 110 of FIG. 1). At 730, the method 700 includes gathering one of the M amplified signals at each of the N wavelengths to form one of M clusters of amplified signals. Each cluster of the M clusters includes one amplified signal at each of the N wavelengths (e.g., via routing in modulator and amplifier stage 110 of FIG. 1). At 740, the method 700 includes routing the M amplified signals into M single dimensional (1D) fiber optic arrays. Each array transmits one amplified signal cluster from the M amplified signal clusters (e.g., via SBC modules 1-M of FIG. 1). At 750, the method 700 includes spectrally combining each of the M amplified signal clusters from the 1D fiber optic arrays to generate M tiled output beams (e.g., via SBC modules 1-M of FIG. 1). At 760, the method 700 includes collimating each of the M tiled output beams to generate a single aggregate combined amplified output beam (e.g., via collimator 130 of FIG. 1). Although not shown, the method 700 also includes generating elliptical beams for the M tiled output beams to facilitate closer packing of the M tiled output beams.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   N master oscillators to generate N master oscillator driving signals, each driving signal at N different wavelengths, N being a positive integer greater than one;
   N splitters to split each of the N master oscillator signals into M coherent signals, M being a positive integer greater than one;
   a modulator and fiber amplifier stage to adjust the relative phases of the M coherent signals and to generate M×N amplified signals, the M×N amplified signals are aggregated into M clusters of N fibers, each of the M clusters include one wavelength from each of the N master oscillator signals;
   M spectral beam combination (SBC) modules to combine each of the M clusters, each SBC module combining the M×N amplified signals at N wavelengths and generating M tiled output beams, each SBC module employs a single dimensional (1D) fiber optic array to transmit one cluster of N amplified signals from the M signal clusters and generates one tiled output beam of the M tiled output beams; and
   a collimator to combine each of the tiled output beams from the output of each of the M SBC modules to generate a single aggregate combined amplified output beam.

2. The system of claim 1, wherein the modulator and fiber amplifier stage further comprises M modulators to adjust the phase of each of the M coherent signals and M amplifiers to generate M amplified signals.

3. The system of claim 1, wherein the SBC modules further comprises a lens and a collimating mirror, the lens passes the amplified signals from the 1D array and the collimating mirror directs the amplified signals passed from the lens within the SBC module.

4. The system of claim 3, wherein the SBC module further comprises a grating to spectrally combine the amplified signals directed from the collimating mirror.

5. The system of claim 3, wherein the lens is an elliptical shaped lens to generate elliptical beams for the M tiled output beams and facilitate packing of the M tiled output beams.

6. The system of claim 5, further comprising M pickoff mirrors having scraper edges to clip Gaussian beams of the M tiled output beams from the SBC modules and to facilitate packing of the M tiled output beams.

7. The system of claim 6, wherein the collimator includes a transmissive optical element, a reflective optical element, or diffractive optical element to compensate for spherical and interference phases of the M tiled output beams.

8. The system of claim 7, further comprising a feedback control circuit to sample the single aggregate combined amplified output beam from the collimator and to provide beam phase adjustment feedback to the modulator and fiber amplifier stage.

9. The system of claim 8, wherein the feedback control circuit includes a beam sampler to sample the single aggregate combined amplified output beam from the collimator.

10. The system of claim 9, wherein the feedback control circuit includes a grating or wavelength de-multiplexer to direct the combined single aggregate amplified output beam from the collimator, an N wavelength phase detector array to detect the phase of N sampled signals, and N synchronous M-beam processors to generate M phase error signals to adjust beam phases in the modulator and fiber amplifier stage.

11. The system of claim 8, wherein the feedback control circuit includes a beam sampler to sample the M tiled output beams before the collimator.

12. The system of claim 11, wherein the feedback control circuit includes a grating or wavelength de-multiplexer to direct the M tiled output beams from the beam sampler, an M×N wavelength phase detector array to detect the phase of N wavelength signals from each of the M tiled output beams, and an M×N phase processor to generate M×N phase error signals from each of the N wavelength signals to adjust beam phase in the modulator and fiber amplifier stage.

13. An apparatus, comprising:
   a plurality of master oscillators to generate a plurality of master oscillator driving signals, each of the driving signals at a different wavelength;
   a plurality of splitters to split each of the plurality of master oscillator signals into a plurality of coherent signals;
   a plurality of modulators to adjust the phase of each of the plurality of coherent signals and to generate a plurality of phased signals relative to other signals originating from the same master oscillator;
   a plurality of amplifiers to generate a plurality of amplified signal clusters from the plurality of phased signals, each of the plurality of amplified signal clusters comprising one amplified signal from each of the plurality of master oscillators;
   a plurality of spectral beam combination (SBC) modules to combine each of the plurality of amplified signal clusters and to generate a plurality of tiled output beams, each SBC module from the plurality of SBC modules employs a single dimensional (1D) fiber optic array to receive one amplified signal cluster from the plurality of amplified signal clusters and generates one tiled output beam of the plurality of tiled output beams; and
   a collimator to combine each of the plurality of tiled output beams from the output of each of the plurality of SBC modules to generate a single aggregate combined amplified output beam.

14. The apparatus of claim 13, further comprising a feedback control circuit to sample the single aggregate combined amplified output beam from the collimator and to provide beam phase adjustment feedback to the plurality of modulators.

15. The apparatus of claim 14, wherein the feedback control circuit includes a beam sampler to sample the single aggregate combined amplified output beam from the collimator.

16. The apparatus of claim 15, wherein the feedback control circuit includes a grating or wavelength de-multiplexer to direct the combined amplified output beam from the collimator, an N wavelength phase detector array to detect the phase of N sampled signals, and N synchronous M-beam processors to generate M phase error signals to adjust beam phases in the plurality of modulators.

17. The apparatus of claim 13, wherein the feedback control circuit includes a beam sampler to sample the M tiled output beams before the collimator.

18. The apparatus of claim 17, wherein the feedback control circuit includes a grating or wavelength de-multiplexer to direct the M tiled output beams from the beam sampler, an M×N wavelength phase detector array to detect the phase of N wavelength signals from each of the M tiled output beams, and an M×N phase processor to generate M phase error signals to adjust beam phase in the plurality of modulators.

19. A method, comprising:
   coherently splitting each of N master oscillator signals of different wavelengths into M coherent signals, N and M being positive integers greater than one;
   amplifying the M coherent signals to generate M amplified signals;
   gathering one of the M amplified signals at each of the N wavelengths to form one of M clusters of amplified signals, with each cluster of the M clusters comprising one amplified signal at each of the N wavelengths;
   routing the M amplified signals into M single dimensional (1D) fiber optic arrays, wherein each array transmits one amplified signal cluster from the M amplified signal clusters;
   spectrally combining each of the M amplified signal clusters from the 1D fiber optic arrays to generate M tiled output beams; and
   collimating each of the M tiled output beams to generate a single aggregate combined amplified output beam.

20. The method of claim 19, further comprising generating elliptical beams for the M tiled output beams to facilitate packing of the M tiled output beams.

* * * * *